(12) United States Patent
Hull et al.

(10) Patent No.: US 6,339,633 B1
(45) Date of Patent: Jan. 15, 2002

(54) AUTOMATIC EXPOSURE INITIATION IN A DIGITAL CCD CAMERA X-RAY IMAGER

(75) Inventors: Richard N. Hull, Calmar; Terrence G. Bayrock, Sherwood Park, both of (CA)

(73) Assignee: Wuestec Medical, Inc., Mobile, AL (US)

( * ) Notice: Subject to any disclaimer, the term of this patent is extended or adjusted under 35 U.S.C. 154(b) by 0 days.

(21) Appl. No.: 09/449,173

(22) Filed: Nov. 24, 1999

(Under 37 CFR 1.47)

Related U.S. Application Data

(60) Provisional application No. 60/110,129, filed on Nov. 27, 1998.

(51) Int. Cl.[7] .................................................. H05G 1/64
(52) U.S. Cl. ........................ 378/91; 378/98.8; 378/191
(58) Field of Search .............................. 378/91, 95, 96, 378/97, 98.8, 114, 191; 348/294, 297; 250/370.09

(56) References Cited

U.S. PATENT DOCUMENTS

| | | | |
|---|---|---|---|
| 3,860,817 A | 1/1975 | Carmean | 250/320 |
| 4,412,346 A | 10/1983 | Takenouti et al. | 378/181 |
| 4,684,565 A | 8/1987 | Abeles et al. | 428/220 |
| 4,761,805 A | 8/1988 | Sebring | 378/181 |
| 4,821,727 A | 4/1989 | Levene et al. | 128/653 |
| 4,890,313 A | 12/1989 | Lam et al. | 378/189 |
| 4,924,487 A | 5/1990 | Nishiki | 378/190 |
| 4,979,198 A | 12/1990 | Malcolm et al. | 378/102 |
| 4,987,307 A | 1/1991 | Rizzo et al. | 250/368 |
| 4,995,068 A | 2/1991 | Chou et al. | 378/189 |
| 5,090,042 A | 2/1992 | Bejjani et al. | 378/99 |
| 5,211,165 A | 5/1993 | Dumoulin et al. | 128/653.1 |
| 5,887,049 A | * 3/1999 | Fossum | 378/98.8 |
| 6,002,742 A | * 12/1999 | Nelvig | 378/98.8 |
| 6,149,300 A | * 11/2000 | Greenway et al. | 378/191 |

FOREIGN PATENT DOCUMENTS

| CA | 2179616 | 7/1994 | G03B/41/16 |
|---|---|---|---|

* cited by examiner

*Primary Examiner*—David P. Porta
(74) *Attorney, Agent, or Firm*—Fulbright & Jaworski L.L.P.

(57) ABSTRACT

The inventive mechanism uses the output of a visible light sensor to provide accurate signal detecting and noise filtering. When the mechanism detects light for a sufficient duration and intensity in the right wavelength, it generates a trigger signal that activates a camera to record an image. Any noise in the light sensor signal is filtered out or ignored by the mechanism. The mechanism measures the light sensor signal over time, and for a signal to be an accurate signal, each measurement needs to be higher in voltage than the preceding measurement, otherwise the signal is rejected as noise.

17 Claims, 4 Drawing Sheets

AUTOMATIC EXPOSURE INITIATION IN A DIGITAL CCD CAMERA X-RAY IMAGER

RELATED APPLICATIONS

The present application claims the benefit of U.S. Provisional Application No. 60/110,129, filed Nov. 27, 1998, the disclosure of which is incorporated herein by reference. The present application is related to concurrently filed U.S. Patent Application, entitled "IMAGE REDIRECTION AND OPTICAL PATH FOLDING," the disclosure of which is incorporated herein by reference.

TECHNICAL FIELD

The present invention relates in general to x-ray systems and in particular to a system for initiating automatic exposure in a digital CCD camera x-ray imager.

BACKGROUND

In conventional x-ray imaging a photographic film is exposed to visible light in order to capture the image of the object being x-rayed. The x-rays are passed through the object and impinge on an imaging screen, such as a phosphor imaging screen. The phosphor imaging screen converts some of the radiation into a selected spectral component (typically visible light). The exposure of the photographic film to the spectral component from the phosphor imaging screen produces the image of the object on the photographic film.

Recent advances in x-ray imaging however have changed the focus from use of photographic films to electronic imaging sensors. Such a system is disclosed in U.S. Pat. No. 5,309,496, entitled "FILMLESS X-RAY APPARATUS AND METHOD OF USING THE SAME", issued to Winsor, which is hereby incorporated herein by reference. In the preferred embodiment of Winsor, a video camera and a frame grabber are used to provide still x-ray images. Winsor uses a photocell detector near the imaging screen to detect the burst of visible light. The photocell would activate the frame grabber upon detecting light, thereby capturing the image on the imaging screen.

Another sensor is a photo multiplier tube (PMT) sensor. This type of sensor converts photons into electrons and through a cascade effect, accelerates the electrons to generate more electrons. This sensor also would measure light coming from the phosphor imaging screen, from the stimulation by the x-rays, and would trigger the camera to acquire the image.

Both types of sensor suffer from the same problem, namely false signaling. The false signal would originate from ambient noise or line noise, e.g. input power supply spikes. Consequently, the camera would be receiving incorrect triggering signals, creating premature imaging. The noise could be any kind of interference that would have a voltage that exceeds the threshold voltage of the sensor.

Therefore, there is a need in the art for an automatic exposure initiator which does not trigger on false signals, and triggers on actual signals.

SUMMARY OF THE INVENTION

These and other objects, features and technical advantages are achieved by a system and method which uses a visible light sensor and a signal detector with integral noise filtering.

The present inventive system comprises a lead (pb) shielded PMT (Photo-Multiplier Tube) as the sensor, which is mounted at right angles to the light/x-ray source and facing with a reflective surface to capture the light, and an AEI PCB (Automatic Exposure Indicator Printed Circuit Board) to provide noise filtering and signal detection. When the PMT detects light for a sufficient duration and intensity in the right wavelength, it generates a signal and outputs it to the board. Any noise in the light signal is filtered out or ignored by the board. Thus, board detects the signal, ignores the noise and initiates the exposure sequence in the digital CCD cameras. The board measures the signal over time, and for a signal to be an accurate signal, each measurement of the signal needs to be higher (in voltage) than the preceding measurement, otherwise the signal is rejected as noise.

Accordingly, it is a technical advantage of the present invention to provide a high resolution digital x-ray imaging system.

It is another technical advantage of the present invention to provide trigger signal to the camera of the imaging system when a light sensor a detects light from the imaging screen.

It is still another technical advantage of the present invention to filter out noise from the light signal from the sensor, and thereby prevent erroneous images.

It is a further technical advantage of the present invention filter noise from a negative going signal or a spike of a short duration from the light signal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

The inventive automatic exposure initiation system measures received from a source and detects when the light reaches a predetermined, qualified level. Upon detection of the predetermined qualified level, the system would send a trigger signal to another component. The predetermined, qualified level is light that increases in measured steps of time so that each succeeding step of time the signal is more positive than the previous step of time. The trigger signal could be used to activate recording media or an alarm system.

A particular use of the inventive system is to trigger a camera in an x-ray system. The triggered camera would then acquire the x-ray image. Such a system is shown in FIG. 1, and more specifically described in concurrently filed U.S. Patent Application [Attorney Docket No. 54978-P005US-09906853], entitled "IMAGE REDIRECTION AND OPTICAL PATH FOLDING," the disclosure of which is incorporated herein by reference.

Figure 1:
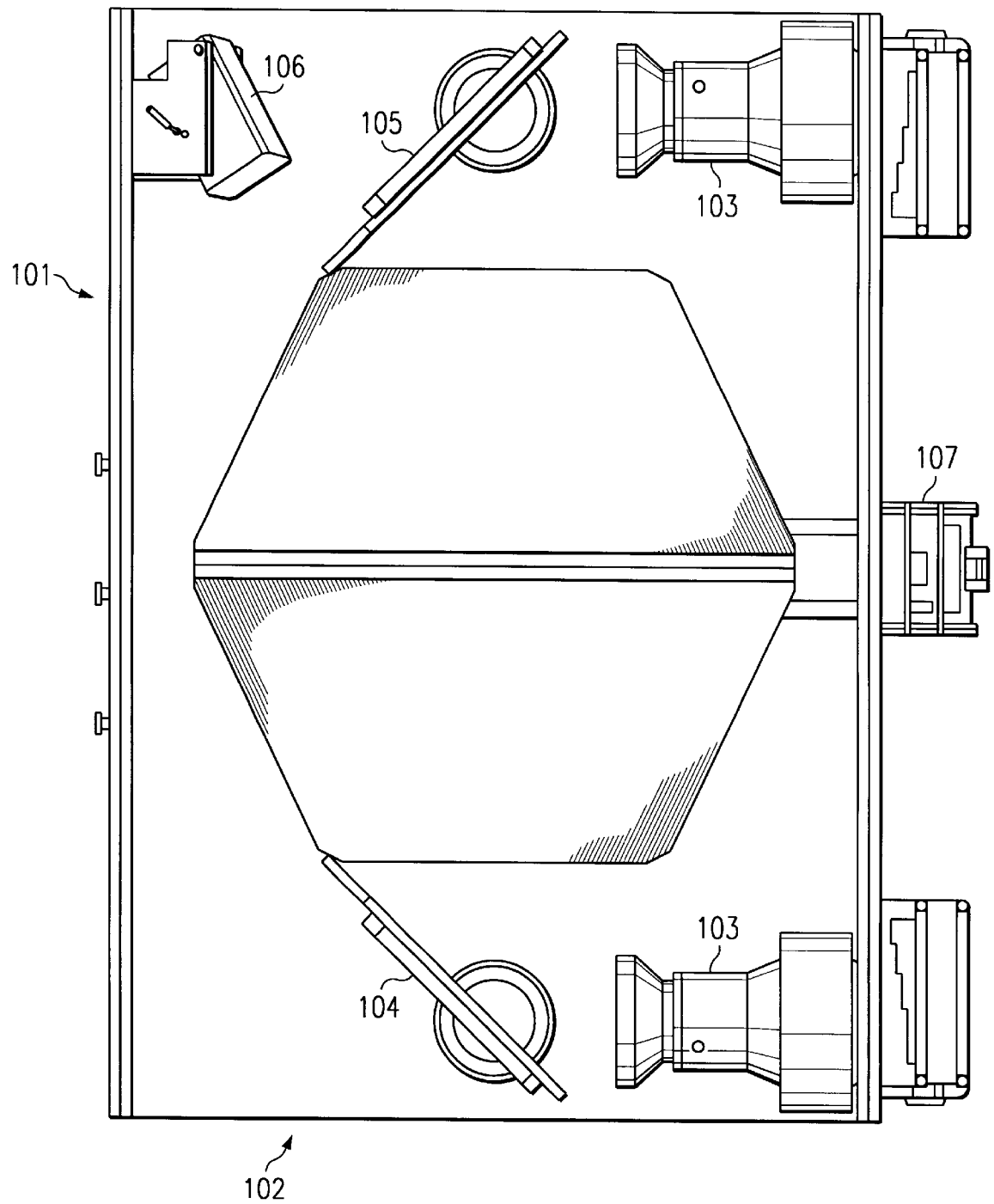
FIG. 1 is an elevation view of an x-ray imaging system with the inventive automatic exposure initiation system.

FIG. 1 depicts a cut-away elevation view of an x-ray imaging system 100. The cutaway portion preferably comprises an imaging screen (not shown), for example a fluorescent phosphor screen used in x-ray imaging. The x-rays are generated by an x-ray source (not shown), and pass through the subject (not shown). The subject absorbs or redirects a portion of the x-rays and passes the remainder. The remainder strikes the phosphor screen, which converts a portion of the x-rays into visible light, which is captured by the camera 103.

In the imaging system 100, the imaging screen is preferably divided into two portions, for example an upper portion and a lower portion. Note that 'upper' and 'lower' do not reflect the actual orientation of the system 100, but rather are used to describe its appearance in FIG. 1. The upper portion of the image from the imaging screen is preferably captured by a first subsystem 101 and the lower portion of the image is preferably captured by a second subsystem 102. The first subsystem includes an imaging sensor 103, which is preferably a CCD camera comprising a photosensitive plate, such as a CCD chip (not shown) and a lens (or lens assembly). The first subsystem also includes a first redirecting element 104 and a second redirecting element 105. The first redirecting element 104 is a front-surfaced mirror, preferably trapezoidal in shape. The front surface reflects the visible light while passing x-ray radiation. The back of the mirror is preferably coated with a substance, such as lead, to absorb x-ray radiation. The first redirecting element 104 is positioned at a 45 degree angle to the plane of the object or the imaging screen. The trapezoidal shape of mirror 104 allows the mirror to encompass the entire field of view of its associated CCD camera 103. The second redirecting element 105 is also a front-surfaced mirror which is trapezoidal in shape. The camera 103 comprises of a series of lens elements used to focus the object onto the CCD. The camera 103 and its associated electronics components are used to acquire the image from the imaging screen. The second subsystem 102 is substantially the same as the first subsystem 101. Note that any type of camera can be used, e.g. film, video, CCD, or CID.

Photo multiplier tube (PMT) sensor 106 is positioned within the system 100 to receive visible light from the imaging screen. As shown in FIG. 1, the PMT sensor 106 is directed toward the imaging screen. As photons of light are received, the PMT sensor sends a corresponding light signal to automatic exposure initiation (AEI) board 107. The light signal varies as the received light varies, consequently the more photons received, the greater the light signal. The AEI board 107 analyzes the light signal to determine if the received signal is tracking the rise of an x-ray pulse, i.e. the signal is rising or increasing with time. If the light signal meets this limitation, then the AEI board 107 activates the cameras 103, 103' to capture the image on the imaging screen. If the light signal does not meet this limitation, then the AEI board 107 disregards the light signal and does not activate the cameras. Consequently, light signal spikes or falling light signals, which could be caused by noise, are ignored. Thus, the AEI board 107 acts only on signals that have the proper level, duration, and are increasing in amplitude; noise of any other wave shape is ignored. The AEI board qualifies the wave shape to that which would occur from the pulse of the x-ray generator, before it triggers the camera. The internal operation of PMT sensors are well known in the art. One type of PMT useable in the inventive system is a PMT type H5784 manufactured by Hamamatsu Corporation. This PMT has sufficient sensitivity for detection of the light levels in the x-ray imaging system. The PMT may be coated with lead to provide protection against the x-rays.

Note that proper positioning of the PMT sensor 106 is very important. Since the PMT sensor is an active device i.e. contains semiconductors, it cannot be mounted facing directly up at the imaging screen, as x-rays would damage the PMT sensor 106. An alternative to the arrangement depicted in FIG. 1 is to mount the PMT sensor is on its side on the base of the imaging system 100 facing towards the center. In this position, the PMT sensor would receive light reflected off of the casing. A portion of the imaging system case is painted white to aid in gathering light, e.g. a flat white 2 inch square. A small mirror could be placed in front of the PMT sensor, at a 45 degree angle, to reflect light into the PMT sensor. The position is important because although the PMT sensor is very sensitive, x-ray beam collimation can be used by the radiographer, thus reducing the area of x-rays reaching the imaging screen. In such a case, it is very important that the position of collimated beam on the intensifying screen be aligned with respect to the PMT sensor.

Note that different types of sensors other than the PMT sensor could be used, such as photo-transistor or photo-diode sensors. Both of these sensor would require amplifiers. Another type of sensor is an x-ray diode; this sensor triggers off of the x-ray light. The preferred sensor is the PMT sensor, because of its sensitivity and packaging that includes a DC converter with a voltage step up circuit and an output amplifier. Further note that although the system 100 is using only a single PMT sensor 106 to trigger both cameras, however, multiple sensors could be used with one or more sensors for each camera. Multiple sensors would be used to cover a larger area. Similarly, only one AEI board 107 is shown, but additional boards could be used, with one board controlling at least one camera.

Figure 2:
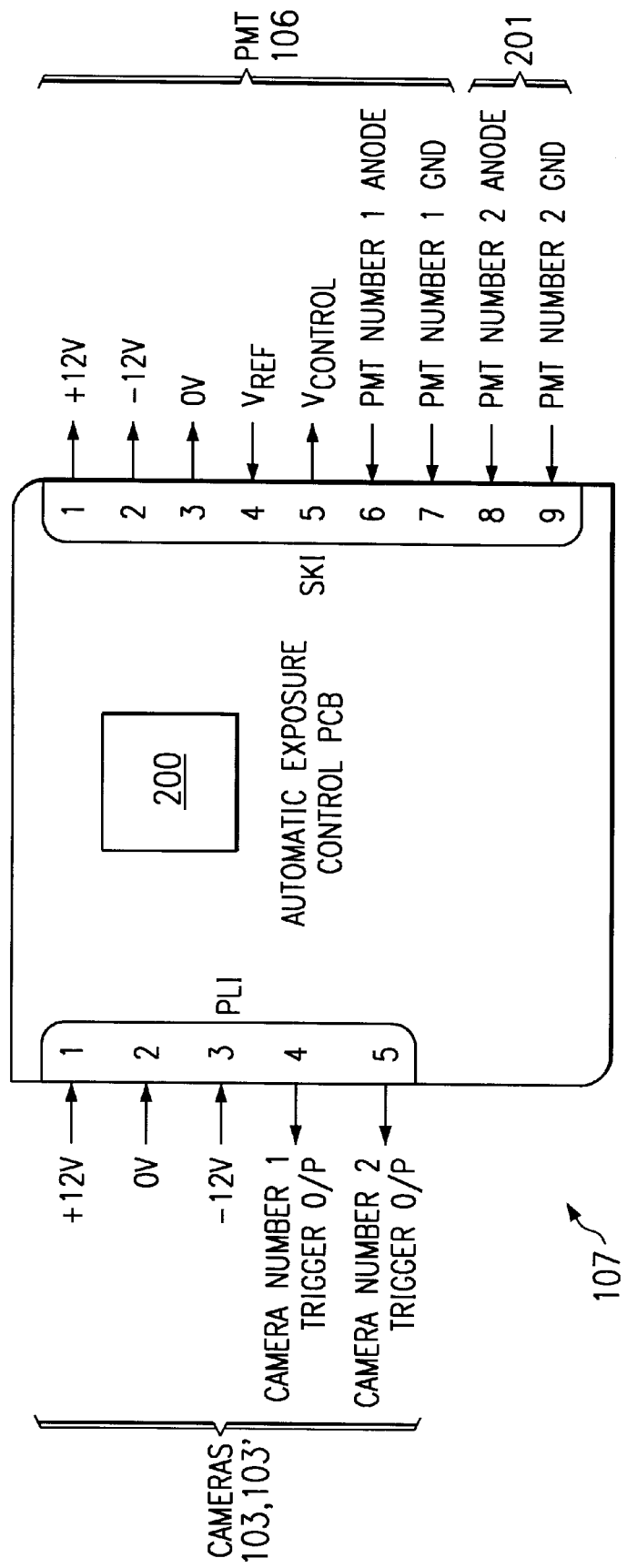
FIG. 2 is a schematic representation of the inventive automatic exposure initiation system.
Figure 3A:
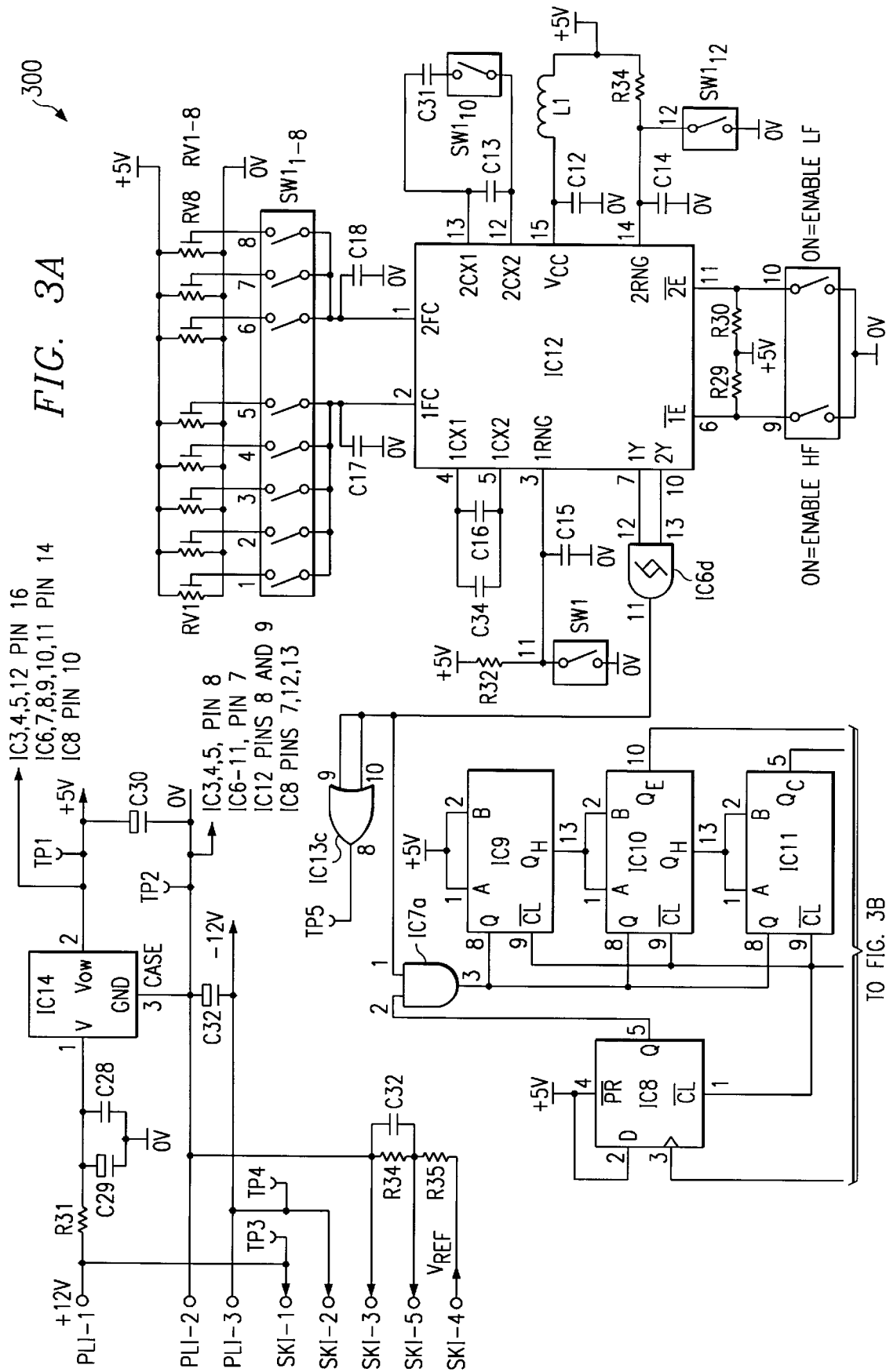
FIGS. 3A and 3B together show a specific preferred embodiment of the inventive automatic exposure initiation system.
Figure 3B:
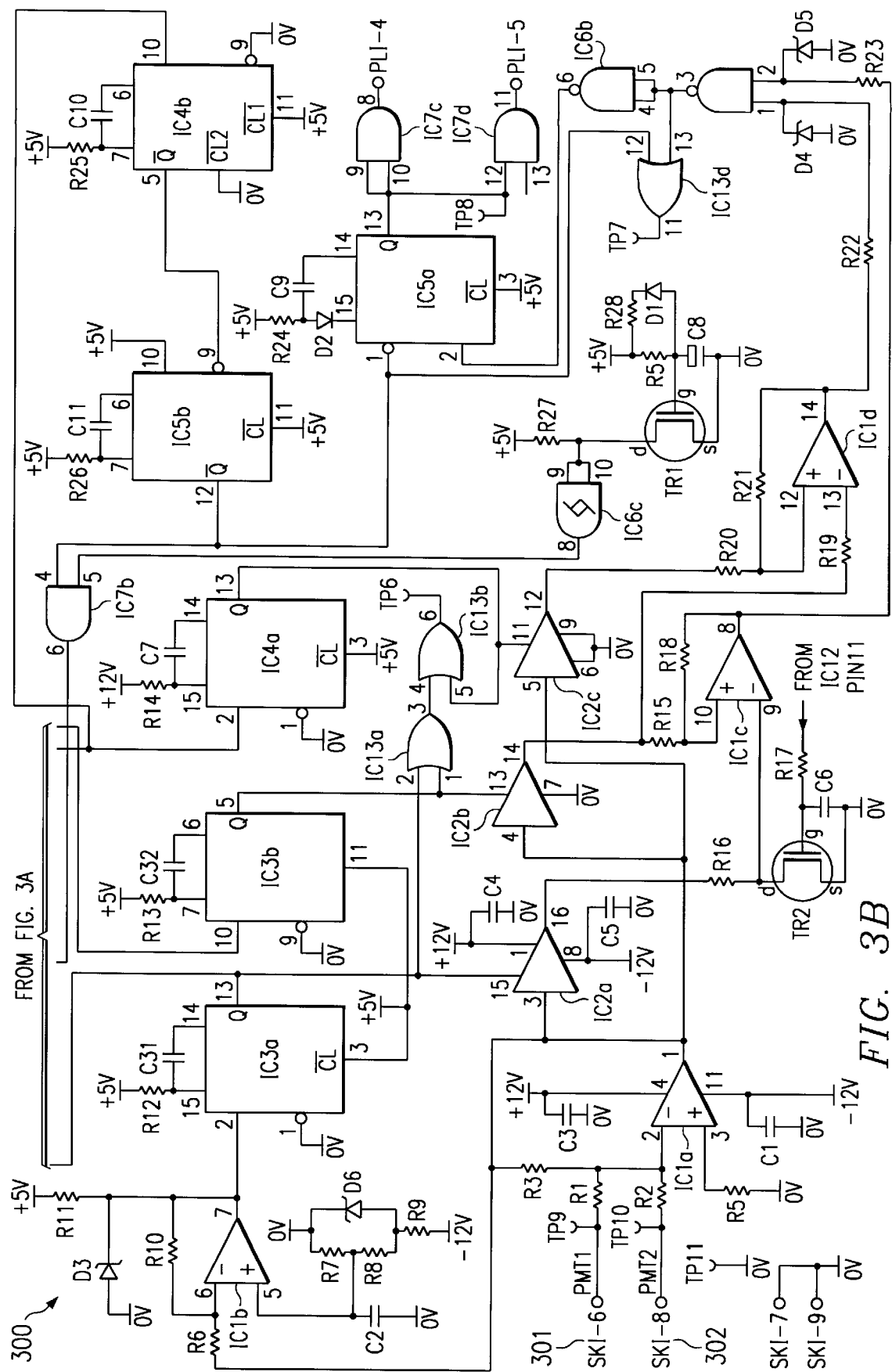

FIG. 2 depicts a block diagram of the AEI board 107 depicting the connections between the board 107, the cameras 103, 103', and the PMT sensor 106. The AEI board receives the PMT light signal output, applies a signal level acquisition criteria, and then produces a digital pulse commensurate in length with the duration of the x-ray pulse, thus indicating an x-ray signal acquisition. The AEI board has connections SK1 1–7 with the PMT sensor 106. The AEI board can also connect to a second PMT sensor via connections SK1 8–9. The AEI board is connected with the cameras 103, 103' via connections PL1 1–5. Connections PL1 1–3 provide power and ground to the board 107, which in turn provides power and ground to the PMT sensor through SK1 1–3. PL1 4 is the connection for the activation signal for camera 103, and PL1 5 is the connection for the activation signal for camera 103'. Vref SK1 4 is a stable, high precision, voltage source derived from the PMT sensor. This voltage is divided down by a potential divider and redirected back to the PMT to supply V control SK1 5. SK1 5 is the control signal from the board to the PMT, which sets the sensitivity of the PMT. SK1 6–7 are the light signals from PMT 106. SK1 8–9 are light signals from a second PMT, if used.

FIG. 2 also includes logic 200, which performs the analysis on the light signal from the PMT sensor 106. Logic 200 determines whether the light signal from the PMT(s) is above a predetermined voltage. If the light signal is greater than the predetermined voltage, then this sample is saved as the first value, V1. This sample then triggers the logic 200 to take two more samples, V2 and V3, at predetermined time intervals from the first sample. If V3>V2>V1, then the logic 200 will send the camera trigger signal(s) to activate the camera(s).

The predetermined time intervals are based on the wavelength/frequency of the x-rays used to produce the light. More specifically, the shorter the wavelength, the higher the frequency, and the faster the rise time of the pulse. Thus, the time intervals between the samples become shorter with increasing x-ray frequency. Note that the phosphor screen will produce light that has the essentially same rise time as the x-ray, but with a slight lag behind the x-ray pulse. The x-ray light signal is essentially shaped as a full wave rectified sine wave. Thus, the leading edge of the light produced from the phosphor screen follows this shape and also sine wave shaped. The samples are taken before the first peak of the sine wave, i.e. prior to $\lambda/4$.

Logic 200 may comprise one or more non-volatile RAM chips, or one or more ROM chips with the logic encoded thereon to perform the functions described above, and other processing chips as needed. Logic 200 may also comprise CPU chips.

Logic 200 may also comprise an arrangement of circuit elements to perform the functions described above. An example of such an arrangement appears in FIGS. 3A–3D. Note that this arrangement is by way of example only as other arrangements could be constructed to perform the functions described above.

Arrangement 300 receives the analog SK1 6 input from the PMT 106 at node 301. If present, arrangement 300 receives the analog SK1 8 input from a second PMT at node 302. The inputs are summed together and sent to input op amp IC1a or unity gain buffer. The op amp output is presented to one arm of a comparator, IC1b, the other arm of IC1b is fed with minimum input signal threshold voltage, which is about one half of a volt. Thus, the PMT would have to output more than one half of a volt before the arrangement 300 activates. If the peak voltage the light intensity received by the PMT sensor is about 8–10 volts, then 0.5 volts occurs around 1/60 of the wavelength of the input x-ray light. Once the signal is greater than the threshold voltage, the value V1 (voltage level) of the signal is stored in sample and hold amplifier IC2a. Also, flip-flops IC3a (mono-stable multi-vibrator) clocks IC8 (D type flip-flop) to enable the output of a VCO (Voltage Controlled Oscillator), IC12 to clock the shift registers IC9,IC10,IC11. The shift registers act as counters which cause two additional light signal samples to be taken, via two taps. The first tap is timed to be approximately 1/16 wavelength of the input x-ray light. This tap acquires the second input voltage level (V2) to be placed into sample and hold amplifier IC2b. The second tap is timed to be approximately 1/8 wavelength of the input x-ray light. This tap acquires a third input voltage level (V3) which is timed at 3/16 wavelength of the input x-ray light, via sample and hold amplifier IC2c. The three acquired input signals (L1, L2, L3) are compared by comparators IC1c and IC1d. If V3>V2>V1, then output flip flop IC5 sends a one second pulse which serves as the camera trigger signal. Because the input light signal rise time depends on the x-ray generator frequency (e.g. 30 Hz to 200 KHz) V2 and V3 sample times vary, to this end the VCO has a selectable frequency control, a bank of DIP (Dual-Inline-Package) switches, SW1–8, are used in conjunction with pre-set timing potentiometers to select the correct shift register clock frequency depending on the frequency of the x-ray source used. Note that the TPs are test points used in testing the operation of the arrangement 300.

An alternative to the circuit arrangement 300, is to use a software program to perform similar functions. The program could be loaded on a board that fits into the imaging system, or it could be loaded onto a separate computer system that is connected to the imaging system, e.g. a commercial PC (Personal Computer). In any event the light signal from the PMT sensor would be sampled by an analogue to digital converter (ADC). The output would be sent to the computer, and provided to the software. The ADC would be continuously sampled and the voltage levels therefrom are programmed into the software. An x-ray exposure event will have been deemed to have occurred if one sample is above the threshold level, a first subsequent sample is higher than the one sample, and a second subsequent sample is higher than the first subsequent sample, all else is deemed to be noise. Essentially the software continuously samples the input signal which has been converted to a 12 bit word by the ADC. The software stores the first sample of a series as S0 (a label) and adds a preset 12 bit word (equivalent to=N=millivolts) to this and stores the result as S1. A second input sample is taken and the digitized version of this (S2) is compared to S1, if S2>S1 then a 12 bit word equivalent to >N=millivolts is added to S2. A third input sample is taken and the digitized version of this (S3) is compared to S2, if S3>S2 then the exposure commences. If any of the comparisons fail the software resets and begins the sample algorithm over again. Note that S0 is always compared to a minimum threshold value or this process remains in the initial sample mode (i.e. does not progress to the S1>S2>S3 comparison). For example, suppose the voltages are in millivolts and expressed in 12 bit words, i.e. 0 to 4095. The first sample S0 is 500 millivolts. The next sample should be at lease 200 millivolts higher, thus 500+200=700 millivolts, which is stored as S1. If the next sample is greater than 700 millivolts, suppose it is 750 millivolts, then 200 is added to 750 (950) and stored as S2. If the next sample, S3 is greater than 950 millivolts, then the camera is triggered. The spacings between the samples are 1/8 wavelength of the input x-ray light and 3/16 wavelength of the input x-ray light, respectively. The software is modified to reflect the different x-ray sources.

An alternative to the Vth<V1<V2<V3 (rising slope) mechanisms described above (where Vth is the threshold level) is to use a V1>Vth and V2>Vth and V3>Vth. In other words, the camera is activated three consecutive samples that are above the threshold voltage are detected. This mechanism will eliminate short pulses, however it is not as accurate as the rising slope mechanism. This mechanism can be implemented in hardware, via non-volatile RAM, ROM or circuit elements as in FIGS. 3A–3D. This mechanism may also be implemented in software, as follows. Again, the input signal is continuously sampled and converted to a 12 bit word. Three consecutive samples S1, S2 and S3 must be above a preset threshold, and there must be >N=of these consecutive >above threshold=samples present for the camera to be activated.

Note that for the mechanisms described herein, the sample rate available determines >N=and therefore the minimum pulse allowable for exposure initiation. In other words, the sample rate available determines the number of samples (N) that can be made during the rising edge of the light pulse from the phosphor, the speed of the circuitry determines the steepest pulse to be read by these mechanisms.

Another alternative mechanism is to use a V1>Vth1 and V2>Vth2 and V3>Vth3. In other words, the camera is activated when three consecutive samples that are each above a respective threshold voltage are detected. Since the x-ray light pulse has a shape of full wave rectified sine wave, the threshold voltages are selected so as to correspond to the shape of the x-ray pulse. For example, $\lambda/90$, $\lambda/16$, and $3/16\lambda$, corresponds to 0.7 volts, 3.8 volts, and 9.2 volts, respectively, for a 10 volt maximum received signal. (For example, 10 sine $(\lambda/90)=0.7$). This mechanism can be implemented in hardware, via non-volatile RAM, ROM or circuit elements as in FIGS. 3A–3D. This mechanism may also be implemented in software, as described above. Note that the profile of the x-ray generator being used would have to be set in the mechanism.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for initiating an image recording medium to record an image, the system comprising:
    a light sensor that detects light from the image and produces a light signal indicating an intensity of the detected light; and
    a mechanism that determines whether the light signal exceeds a predetermined threshold and has a waveform that is similar to a waveform of light from a light source, and initiates the recording medium if the light signal exceeds a predetermined threshold and has a waveform that is similar to a waveform of light from a light source, and wherein the mechanism determines whether the detected light is rising for a predetermined time period based on a wavelength of the light source.

2. The system of claim 1, wherein:
    the light source is an x-ray generator producing x-ray light;
    the light sensor detects visible light that has been converted from the x-ray light.

3. The system of claim 1, wherein the mechanism is selected from the group consisting of:
    an arrangement of circuit elements, a computer program encoded on a computer readable medium, and a hardware logic encoded chip.

4. The system of claim 3, wherein:
    the light sensor is photo multiplier tube; and
    the predetermined threshold is about 0.5 volts.

5. The system of claim 4, wherein:
    the mechanism samples the intensity of the light at a first time period of $1/(1/16$ the wavelength of the light source) after the predetermined threshold has been detected.

6. The system of claim 5, wherein:
    the mechanism samples the intensity of the light at a second time period of $1/(3/16$ the wavelength of the light source) after the predetermined threshold has been detected.

7. The system of claim 6, wherein:
    the mechanism initiates the recording medium if the intensity of the light at the first time period intensity exceeds the intensity of the light that exceeded the predetermined threshold, and if the intensity of the light at the second time period exceeds the intensity of the light at the first time period.

8. A method for initiating an image recording medium to record an image, the method comprising the steps of:
    detecting light from the image by a light sensor;
    producing a light signal indicating an intensity of the detected light;
    determining whether the light signal exceeds a predetermined threshold and has a waveform that is similar to a waveform of light from a light source, wherein the step of determining comprises the step of determining whether the detected light is rising for a predetermined time period based on a wavelength of the light source; and
    initiating the recording medium if the light signal exceeds a predetermined threshold and has a waveform that is similar to a waveform of light from a light source.

9. The method of claim 8, wherein the light source is an x-ray generator and the light sensor detects visible light, the method further comprising the steps of:
    producing x-ray light from the x-ray generator; and
    converting a portion of the x-ray light into visible light.

10. The method of claim 8, wherein:
    the light sensor is photo multiplier tube; and
    the predetermined threshold is about 0.5 volts.

11. The method of claim 10, wherein the step of determining whether the detected light is rising comprises the step of:
    sampling the intensity of the light at a first time period of $1/(1/16$ the wavelength of the light source) after the predetermined threshold has been detected.

12. The method of claim 11, wherein the step of determining whether the detected light is rising further comprises the step of:
    sampling the intensity of the light at a second time period of $1/(3/16$ the wavelength of the light source) after the predetermined threshold has been detected.

13. The method of claim 12, wherein the step of initiating the recording medium comprises the step of:
    initiating the recording medium if the intensity of the light at the first time period intensity exceeds the intensity of the light that exceeded the predetermined threshold, and if the intensity of the light at the second time period exceeds the intensity of the light at the first time period.

14. A computer program product having a computer readable medium having computer program logic recorded thereon for initiating an image recording medium to record an image after detection of the light from the image by a light sensor, wherein the light sensor produces a light signal indicating an intensity of the detected light; the computer program product comprising:
    means for determining whether the light signal exceeds a predetermined threshold and has a waveform that is similar to a waveform of light from a light source; and
    means for initiating the recording medium if the light signal exceeds a predetermined threshold and has a waveform that is similar to a waveform of light from a light source;
    wherein the light source is an x-ray generator that produces x-ray light, and the light sensor detects visible light converted from the x-ray light, wherein the means for determining comprises:

means for determining whether the detected light is rising for a predetermined time period based on a wavelength of the light source.

15. The computer program product of claim 14, wherein the light sensor is photo multiplier tube and the predetermined threshold is about 0.5 volts, and the means for determining whether the detected light is rising comprises:

means for sampling the intensity of the light at a first time period of $1/(\frac{1}{16}$ the wavelength of the light source) after the predetermined threshold has been detected.

16. The computer program product of claim 14, wherein the means for determining whether the detected light is rising further comprises:

means for sampling the intensity of the light at a second time period of $1/(\frac{3}{16}$ the wavelength of the light source) after the predetermined threshold has been detected.

17. The computer program product of claim 16, wherein the means for initiating the recording medium comprises:

means for initiating the recording medium if the intensity of the light at the first time period intensity exceeds the intensity of the light that exceeded the predetermined threshold, and if the intensity of the light at the second time period exceeds the intensity of the light at the first time period.

* * * * *